United States Patent
Harada et al.

(10) Patent No.: US 12,041,621 B2
(45) Date of Patent: Jul. 16, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 462 days.

(21) Appl. No.: 17/273,956

(22) PCT Filed: Sep. 7, 2018

(86) PCT No.: PCT/JP2018/033319
§ 371 (c)(1),
(2) Date: Mar. 5, 2021

(87) PCT Pub. No.: WO2020/049745
PCT Pub. Date: Mar. 12, 2020

(65) Prior Publication Data
US 2021/0337578 A1    Oct. 28, 2021

(51) Int. Cl.
*H04W 72/23*  (2023.01)
*H04W 74/0833*  (2024.01)

(52) U.S. Cl.
CPC ....... *H04W 72/23* (2023.01); *H04W 74/0833* (2013.01)

(58) Field of Classification Search
CPC .......................... H04W 72/23; H04W 74/0833
See application file for complete search history.

(56) References Cited

U.S. PATENT DOCUMENTS

| | | | |
|---|---|---|---|
| 2019/0394082 A1* | 12/2019 | Cirik | H04W 76/28 |
| 2020/0045569 A1* | 2/2020 | Seo | H04L 5/0048 |
| 2020/0045709 A1* | 2/2020 | Seo | H04W 72/53 |
| 2020/0045745 A1* | 2/2020 | Cirik | H04W 24/08 |
| 2021/0050904 A1* | 2/2021 | Cirik | H04W 74/0833 |

OTHER PUBLICATIONS

Extended European Search Report issued in European Application No. 18932963.4 mailed on Mar. 25, 2022 (11 pages).
Office Action issued in Japanese Application No. 2020-540991 mailed on Feb. 22, 2022 (6 pages).
Nokia, Nokia Shanghai Bell, "Remaining Details on Beam Recovery", 3GPP TSG-RAN WG1 Meeting #93, R1-1807185, Busan, Korea, May 21-25, 2018 (10 pages).
Sony, "Remaining issues on beam management and beam failure recovery", 3GPP TSG-RAN WG1 #94, R1-1808330, Gothenburg, Sweden, Aug. 20-24, 2018 (6 pages).
(Continued)

*Primary Examiner* — Ajay Cattungal
(74) *Attorney, Agent, or Firm* — Osha Bergman Watanabe & Burton LLP

(57) ABSTRACT

A user terminal includes a reception section that receives control information on a downlink, and a control section that performs processing related to at least one of radio link failure monitoring and beam failure detection based on a specified signal in a case where the control information neither indicates information on a reference signal to be used for the processing nor downlink transmission configuration information associated with the reference signal.

6 Claims, 8 Drawing Sheets

```
ControlResourceSet ::=                    SEQUENCE {
    controlResourceSetId                    ControlResourceSetId,
~
    tci-StatesPDCCH-ToAddList               SEQUENCE(SIZE (1..maxNrofTCI-StatesPDCCH)) OF TCI-StateId     OPTIONAL,
    -- Need N
    ...
}
```

```
ControlResourceSetZero ::=    INTEGER (0..15)
```

(56) References Cited

OTHER PUBLICATIONS

Catt, "Issues on beam management", 3GPP TSG RAN WG1 Meeting #94, R1-1808375, Gothenburg, Sweden, Aug. 20-24, 2018 (3 pages).
Catt, "Corrections to Nr Pdcch", 3GPP TSG RAN WG1 Meeting #94, R1-1808378, Gothenburg, Sweden, Aug. 20-24, 2018 (8 pages).
Samsung, "Remaining Issues on Multi-Beam Operation", 3GPP TSG RAN WG1 Meeting #94, R1-1808750, Gothenburg, Sweden, Aug. 20-24, 2018 (7 pages).
Ericsson, "Feature lead summary for beam management—Thursday", 3GPP TSG-RAN WG1 Meeting #94, Tdoc R1-1809864, Gothenburg, Aug. 20-24, 2018 (26 pages).
3GPP TS 38.331 V15.2.1 "3rd Generation Partnership Project; Technical Specification Group Radio Access Network; NR; Radio Resource Control (RRC) protocol specification (Release 15)" Jun. 2018 (303 pages).
3GPP TS 38.213 V15.2.0 "3rd Generation Partnership Project; Technical Specification Group Radio Access Network; NR; Physical layer procedures for control (Release 15)" Jun. 2018 (99 pages).
International Search Report issued in International Application No. PCT/JP2018/033319, mailed Nov. 8, 2018 (3 bages).
Written Opinion issued in International Application No. PCT/JP2018/033319; Dated Nov. 8, 2018 (3 pages).
Office Action issued in Indian Application No. 202137009853 mailed on Nov. 9, 2022 (8 pages).
Decision of Refusal issued in Japanese Application No. 2020-540991 mailed on May 24, 2022 (6 pages).
Office Action issued in counterpart Chinese Patent Application No. 201880097316.3 mailed on Jan. 5, 2024 (13 pages).
Office Action issued in counterpart European Patent Application No. 18 932 963.4 mailed on Feb. 8, 2024 (10 pages).
Office Action issued in Chinese Application No. 201880097316.3, mailed May 15, 2024 (8 pages).

* cited by examiner

```
BWP-DownlinkDedicated ::=      SEQUENCE {
   pdcch-Config                SetupRelease { PDCCH-Config }    OPTIONAL,   -- Need M
   pdsch-Config                SetupRelease { PDSCH-Config }    OPTIONAL,   -- Need M
   sps-Config                  SetupRelease { SPS-Config }      OPTIONAL,   -- Need M
   radioLinkMonitoringConfig   SetupRelease { RadioLinkMonitoringConfig }   OPTIONAL,   -- Need M
   ...
}

RadioLinkMonitoringConfig ::=   SEQUENCE {
   failureDetectionResourcesToAddModList    SEQUENCE (SIZE(1..maxNrofFailureDetectionResources)) OF RadioLinkMonitoringRS
      OPTIONAL,   -- Need N
   failureDetectionResourcesToReleaseList   SEQUENCE (SIZE(1..maxNrofFailureDetectionResources)) OF
      RadioLinkMonitoringRS-Id  OPTIONAL,   -- Need N
   beamFailureInstanceMaxCount              ENUMERATED {n1, n2, n3, n4, n5, n6, n8, n10}
      OPTIONAL,   -- Need S
   beamFailureDetectionTimer                ENUMERATED {pbfd1, pbfd2, pbfd3, pbfd4, pbfd5, pbfd6, pbfd8, pbfd10}
      OPTIONAL,   -- Need R
   ...
}

RadioLinkMonitoringRS ::=       SEQUENCE {
   radioLinkMonitoringRS-Id    RadioLinkMonitoringRS-Id,
   purpose                     ENUMERATED {beamFailure, rlf, both},
   detectionResource           CHOICE {
      ssb-Index                   SSB-Index,
      csi-RS-Index                NZP-CSI-RS-ResourceId
   },
   ...
}
```

FIG. 5

USER TERMINAL AND RADIO COMMUNICATION METHOD

TECHNICAL FIELD

The present disclosure relates to a user terminal and a radio communication method.

BACKGROUND ART

Long Term Evolution (LTE) has been specified for achieving a higher data rate, lower latency, and the like in a Universal Mobile Telecommunications System (UMTS) network. Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT), and New Radio (NR).

Currently, operations related to radio link monitoring and beam failure detection are specified between a user terminal and a radio base station.

CITATION LIST

Non-Patent Literature

NPL 1
3GPP TS 38.331 V15.2.1 "3rd Generation Partnership Project; Technical Specification Group Radio Access Network; NR; Radio Resource Control (RRC) protocol specification (Release 15)", June 2018

NPL 2
3GPP TS 38.213 V15.2.0 "3rd Generation Partnership Project; Technical Specification Group Radio Access Network; NR; Physical layer procedures for control (Release 15)", June 2018

SUMMARY OF INVENTION

Technical Problem

However, operations of the user terminal (and the radio base station) related to radio link monitoring and/or beam failure detection is not adequately specified and there is a possibility that the user terminal (and the radio base station) is not available to achieve radio link monitoring and/or beam failure detection.

In one aspect of the present disclosure, one object is to provide a user terminal and a radio communication method that is available to achieve radio link monitoring and/or beam failure detection in a radio communication system.

Solution to Problem

A user terminal according to one aspect of the present disclosure includes: a reception section that receives control information on a downlink; and a control section that performs processing related to at least one of radio link failure monitoring and beam failure detection based on a specified signal in a case where the control information neither indicates information on a reference signal to be used for the processing nor downlink transmission configuration information associated with the reference signal.

Advantageous Effects of Invention

According to one aspect of the present disclosure, it is possible to achieve radio link monitoring and/or beam failure detection in a radio communication system.

BRIEF DESCRIPTION OF DRAWINGS

FIG. 5 illustrates an example of configuration information on RLM (Radio Link Monitoring) according to the embodiment;

DESCRIPTION OF EMBODIMENTS

Hereinafter, an embodiment of the present disclosure will be described with reference to the accompanying drawings.

Embodiment

Figure 1:
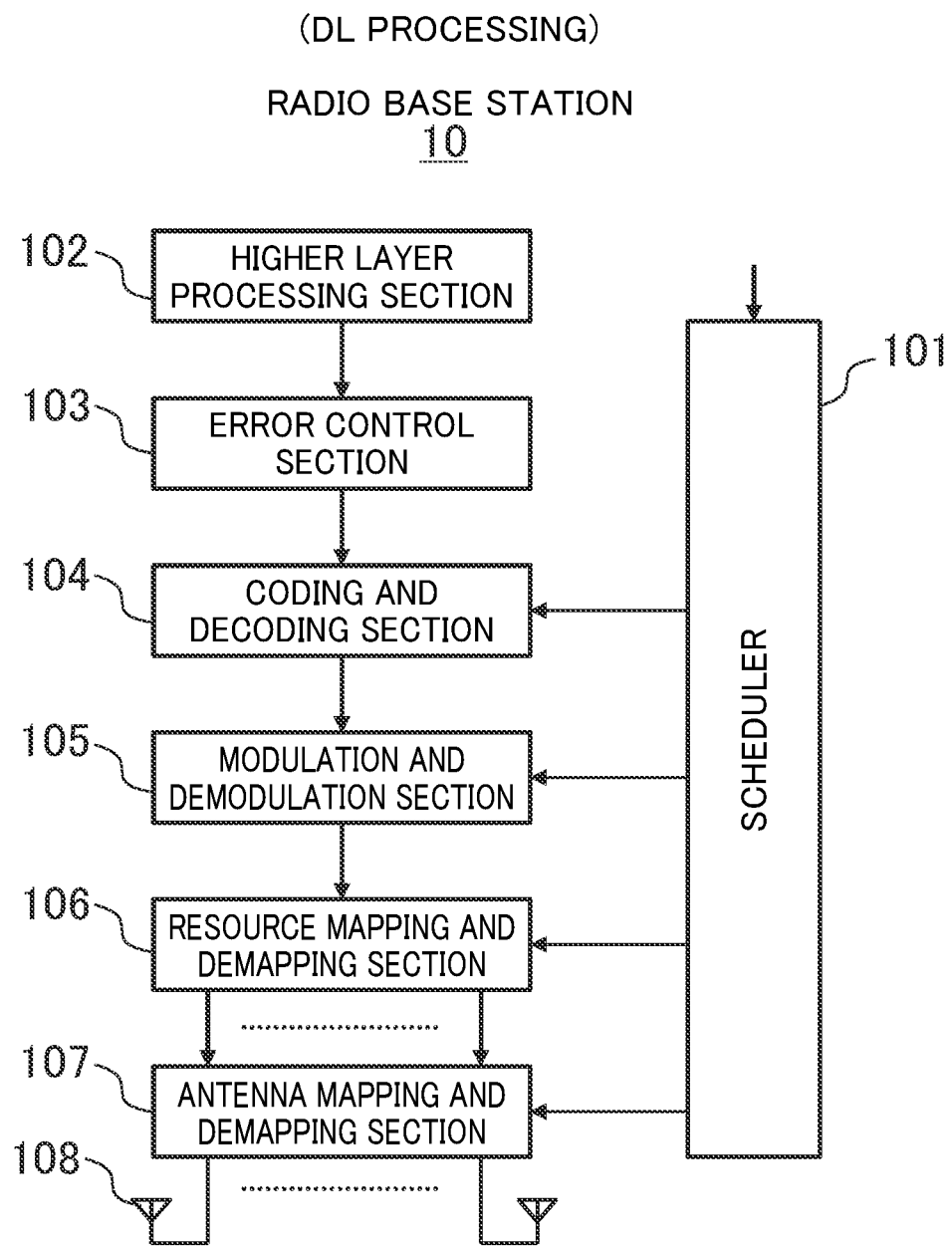
FIG. 1 illustrates an exemplary configuration and an exemplary DL (DownLink) processing of a radio base station according to an embodiment.
Figure 2:
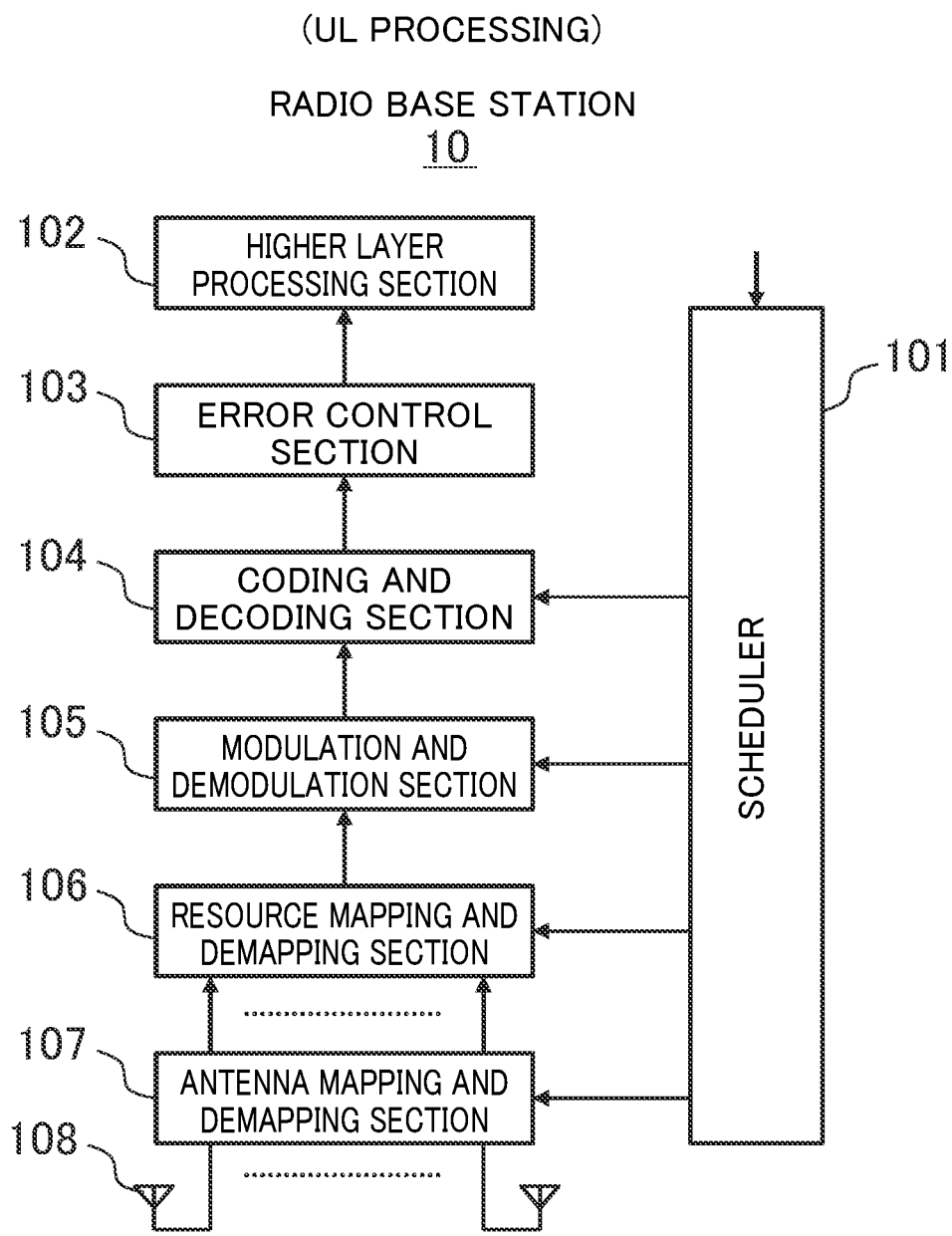
FIG. 2 illustrates an exemplary configuration and an exemplary UL (UpLink) processing of the radio base station according to the embodiment.
Figure 3:
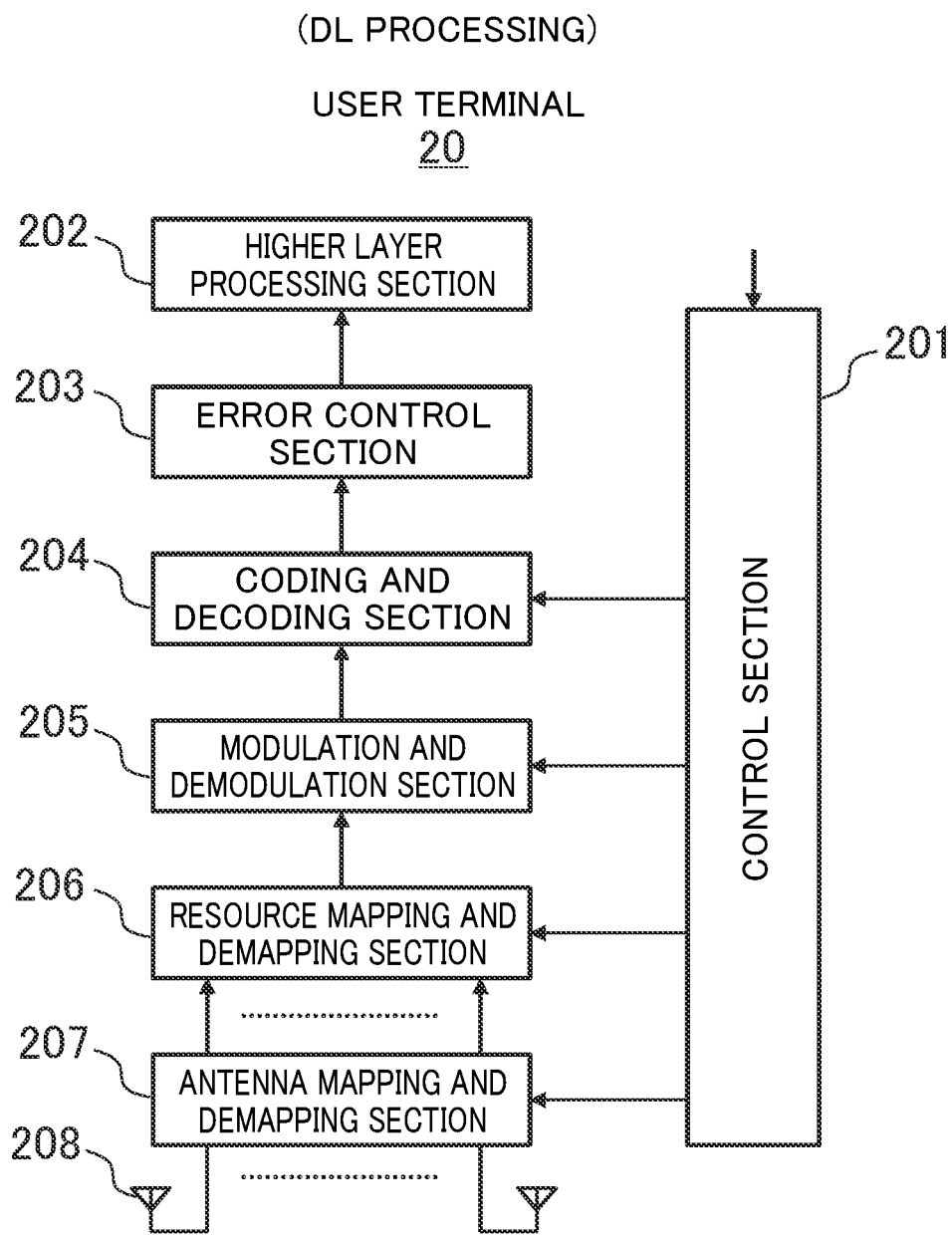
FIG. 3 illustrates an exemplary configuration and an exemplary DL (DownLink) processing of a user terminal according to the embodiment.
Figure 4:
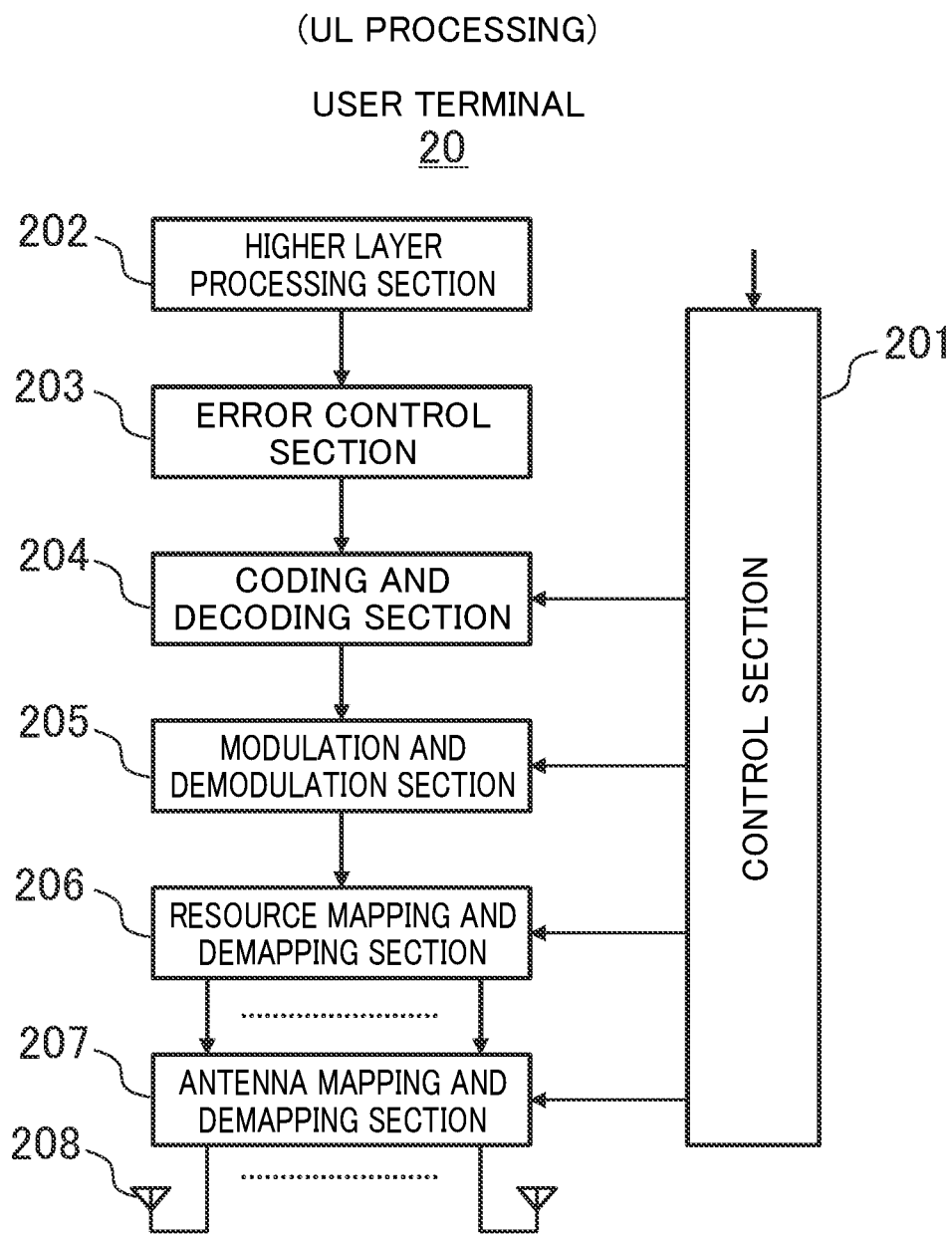
FIG. 4 illustrates an exemplary configuration and an exemplary UL (UpLink) processing of the user terminal according to the embodiment.

A radio communication system according to the embodiment includes at least radio base station 10 illustrated in FIGS. 1 and 2 and user terminal 20 illustrated in FIGS. 3 and 4. User terminal 20 connects to (accesses) radio base station 10.

<Radio Base Station>

FIGS. 1 and 2 illustrate an exemplary configuration of radio base station 10 according to the embodiment. Radio base station 10 includes scheduler 101, higher layer processing section 102, error control section 103, coding and decoding section 104, modulation and demodulation section 105, resource mapping and demapping section 106, antenna mapping and demapping section 107, and one or more antennas 108.

Next, processing (DL processing) in which radio base station 10 transmits a signal to user terminal 20 will be described with reference to FIG. 1.

Higher layer processing section 102 generates a transmission signal such as a DL data signal and a DL control signal. The DL control signal may include DL control information (DCI: Downlink Control Information) including MCS (Modulation and Coding Scheme) information. Higher layer processing section 102 outputs the generated transmission signal to error control section 103.

Error control section 103 adds a signal for error detection such as CRC (Cyclic Redundancy Check) to the transmission signal output from higher layer processing section 102 and outputs a resulting signal to coding and decoding section 104.

Based on setting (for example, MCS information) from scheduler 101, coding and decoding section 104 applies encoding processing to the transmission signal output from error control section 103 and outputs a resulting signal to modulation and demodulation section 105.

Based on setting (for example, MCS information) from scheduler 101, modulation and demodulation section 105 applies modulation processing to the transmission signal output from coding and decoding section 104 and outputs a resulting signal to resource mapping and demapping section 106.

Based on setting (for example, resource allocation information) from scheduler 101, resource mapping and demapping section 106 maps the transmission signal (DL data signal, DL control signal, RS (Reference Signals), and the like) output from modulation and demodulation section 105 to RBs (Resource Blocks). Resource mapping and demapping section 106 then outputs each transmission signal mapped to each RB to antenna mapping and demapping section 107.

Based on setting (for example, antenna allocation information) from scheduler 101, antenna mapping and demapping section 107 maps each transmission signal output from resource mapping and demapping section 106 to each antenna 108. Antenna mapping and demapping section 107 then outputs the transmission signal to mapping destination antenna 108.

Antenna 108 outputs (transmits) the transmission signal output from antenna mapping and demapping section 107 to space.

Scheduler 101 sets MCS information (for example, a coding rate and a modulation scheme) to coding and decoding section 104 based on channel quality (for example, CSI (Channel State Information)) between radio base station 10 and user terminal 20. Scheduler 101 determines an RB to which each transmission signal (DL data signal, DL control signal, RS, and the like) is to be allocated and sets resource allocation information, which is its determination result, to resource mapping and demapping section 106. Scheduler 101 determines antenna 108 that transmits each transmission signal allocated to each RB, and sets antenna allocation information, which is its determination result, to antenna mapping and demapping section 107. In addition, scheduler 101 may perform setting for performing beam forming using a plurality of antennas 108.

Next, with reference to FIG. 2, processing (UL processing) in which radio base station 10 receives a signal from user terminal 20 will be described.

Each antenna 108 receives a signal transmitted from user terminal 20 and outputs it to antenna mapping and demapping section 107.

Based on setting (for example, antenna allocation information) from scheduler 101, antenna mapping and demapping section 107 demaps the reception signal output from each antenna 108, and outputs a resulting signal to resource mapping and demapping section 106.

Based on setting (for example, resource allocation information) from scheduler 101, resource mapping and demapping section 106 extracts (demaps) the reception signal (UL data signal, UL control signal, RS, and the like) from each RB, and outputs it to modulation and demodulation section 105.

Based on setting (for example, MCS information) from scheduler 101, modulation and demodulation section 105 demodulates the reception signal output from resource mapping and demapping section 106 and outputs a resulting signal to coding and decoding section 104.

Based on setting (for example, MCS information) from scheduler 101, coding and decoding section 104 decodes the reception signal output from modulation and demodulation section 105 and outputs a resulting signal to error control section 103.

Error control section 103 performs error detection on the reception signal output from coding and decoding section 104 and removes a signal for error detection, and then outputs a resulting signal to higher layer processing section 102. When error control section 103 detects an error, it may notify higher layer processing section 102 of detection of the error.

Higher layer processing section 102 receives the reception signal (UL data signal, UL control signal, RS, and the like) output from error control section 103 and performs predetermined processing. For example, higher layer processing section 102 performs MAC (Medium Access Control) processing and RLC (Radio Link Control) processing related to layer 2, RRC (Radio Resource Control) processing related to layer 3, and the like.

Since UL processing in scheduler 101 is substantially the same as the case of the above-described DL processing, its description will be omitted.

<User Terminal>

FIGS. 3 and 4 illustrate an exemplary configuration of user terminal 20 according to the embodiment. User terminal 20 includes control section 201, higher layer processing section 202, error control section 203, coding and decoding section 204, modulation and demodulation section 205, resource mapping and demapping section 206, antenna mapping and demapping section 207, and one or more antennas 208.

Next, with reference to FIG. 3, processing (DL processing) in which user terminal 20 receives a signal from radio base station 10 will be described.

Each antenna 208 receives a signal transmitted from radio base station 10 and outputs it to antenna mapping and demapping section 207.

Based on setting from control section 201, antenna mapping and demapping section 207 demaps the reception signal output from each antenna 208 and outputs a resulting signal to resource mapping and demapping section 206.

Based on setting from control section 201, resource mapping and demapping section 206 extracts (demaps) the reception signal (DL data signal, DL control signal, RS, and the like) from each RB allocated to user terminal 20 and outputs it to modulation and demodulation section 205.

Based on setting from control section 201, modulation and demodulation section 205 demodulates the reception signal output from resource mapping and demapping section 206 and outputs a resulting signal to coding and decoding section 204.

Based on setting from control section 201, coding and decoding section 204 decodes the reception signal output from modulation and demodulation section 205 and outputs a resulting signal to error control section 203.

Error control section 203 performs error detection on the reception signal output from coding and decoding section 204 and removes a signal for error detection, and then outputs a resulting signal to higher layer processing section 202. When error control section 203 detects an error, it may notify higher layer processing section 202 of detection of the error.

Higher layer processing section 202 receives the reception signal (DL data signal, DL control signal, RS, and the like) output from error control section 203 and performs predetermined processing. For example, higher layer processing section 202 performs MAC (Medium Access Control) processing and RLC (Radio Link Control) processing related to layer 2, RRC (Radio Resource Control) processing related to layer 3, and the like.

Control section 201 sets coding and decoding section 204 based on MCS information (for example, a coding rate and a modulation scheme) received from radio base station 10. Control section 201 sets resource mapping and demapping section 206 based on resource allocation information received from radio base station 10. Also, control section 201 sets antenna mapping and demapping section 207. In addition, control section 201 may perform setting for performing beam forming using a plurality of antennas 208.

Next, with reference to FIG. 4, processing (UL processing) in which user terminal 20 transmits a signal to radio base station 10 will be described.

Higher layer processing section 202 generates a transmission signal such as a UL data signal and a UL control signal. Higher layer processing section 202 outputs the generated transmission signal to error control section 203.

Error control section 203 adds a signal for error detection such as CRC to the transmission signal output from higher layer processing section 202 and outputs a resulting signal to coding and decoding section 204.

Based on setting from control section 201, coding and decoding section 204 applies encoding processing to the transmission signal output from error control section 203, and outputs a resulting signal to modulation and demodulation section 205.

Based on setting from control section 201, modulation and demodulation section 205 applies modulation processing to the transmission signal output from coding and decoding section 204 and outputs a resulting signal to resource mapping and demapping section 206.

Based on setting from control section 201, resource mapping and demapping section 206 maps the transmission signal (UL data signal, UL control signal, RS, and the like) output from modulation and demodulation section 205 to RBs. Resource mapping and demapping section 206 then outputs each transmission signal allocated to each RB to antenna mapping and demapping section 207.

Based on setting from control section 201, antenna mapping and demapping section 207 maps each transmission signal output from resource mapping and demapping section 206 to each antenna 208. Antenna mapping and demapping section 207 then outputs the transmission signal to mapping destination antenna 208.

Antenna 208 outputs (transmits) the transmission signal output from antenna mapping and demapping section 207 to space.

Since UL processing in control section 201 is substantially the same as the case of the above-described DL processing, its description will be omitted.

Radio base station 10 transmits the DL control signal to user terminal 20 by using a downlink control channel (for example, PDCCH: Physical Downlink Control Channel) and transmits the DL data signal and the RS by using a downlink data channel (for example, a downlink shared channel: PDSCH: Physical Downlink Shared Channel).

User terminal 20 transmits the UL control signal to radio base station 10 by using an uplink control channel (for example, PUCCH: Physical Uplink Control Channel) and transmits the UL data signal and the RS by using an uplink data channel (for example, an uplink shared channel: PUSCH: Physical Uplink Shared Channel).

Downlink channels and uplink channels used by radio base station 10 and user terminal 20 for transmission and reception are not limited to the above-described PDCCH, PDSCH, PUCCH, PUSCH, and the like, and may be other channels, for example, PBCH (Physical Broadcast Channel) and RACH (Random Access Channel).

In FIGS. 1 to 4, DL and/or UL signal waveforms generated in radio base station 10 and user terminal 20 may be signal waveforms based on OFDM (Orthogonal Frequency Division Multiplexing) modulation. Alternatively, the DL and/or UL signal waveforms may be signal waveforms based on SC-FDMA (Single Carrier-Frequency Division Multiple Access) or DFT-S-OFDM (DFT-Spread-OFDM) or may be other signal waveforms. In FIGS. 1 to 4, description of constituent sections for generating signal waveforms (for example, an IFFT (Inverse Fast Fourier Transform) processing section, a CP (Cyclic Prefix) addition section, a CP removal section, and an FFT (Fast Fourier Transform) processing section) is omitted.

<Study>

As depicted in FIG. 5, radio base station 10 is possible to set RS which user terminal (hereinafter referred to as UE (User Equipment)) 20 uses for radio link monitoring (RLM) and beam failure detection (BFD) as OPTIONAL for each DL BWP (Bandwidth Part). Hereinafter, RS used for RLM are referred to as "RLM-RS" and RS used for BFD are referred to as "BFD-RS."

When RLM-RS or BFD-RS is not set to explicit in a parameter RadioLinkMonitoringConfig, UE 20 monitors RS associated with an active TCI state of PDCCH for RLM or BFD. TCI is an abbreviation of transmission configuration indication. In addition, TCI is an example of transmission configuration information.

Regarding RLM, the following is specified.

When UE 20 is not provided with a higher layer parameter RadioLinkMonitoringRS but is provided with one or more CSI-RS and/or one or more RS including SS/PBCH (Synchronization Signal/Physical Broadcast Channel) blocks by a higher layer parameter TCI-states related to PDCCH reception, UE 20 performs at least one operation of the following (A1) to (A3).

(A1) When an active TCI state related to PDCCH reception includes a single RS, UE 20 uses the RS provided by the active TCI state for PDCCH reception for RLM.

(A2) When the active TCI state related to PDCCH reception includes two RS, the UE expects that one RS has a QCL (Quasi Co-Location)-TypeD, and uses the RS with the QCL-TypeD for RLM. Furthermore, UE 20 does not expect that both RSs have the QCL-TypeD.

(A3) UE 20 is not required to use aperiodic or quasi-persistent RS for RLM.

Regarding BFD, the following is specified.

UE 20 determines the following when it is not provided with a higher layer parameter failureDetectionResources. That is, UE 20 determines that a set of q-o (that is, monitoring target RS) includes a periodic CSI-RS resource configuration index having the same value, as an RS index in an RS set indicated by the higher layer parameter TCI-states for each parameter Control Resource Sets which UE 20 itself uses for monitoring PDCCH.

Figure 6:
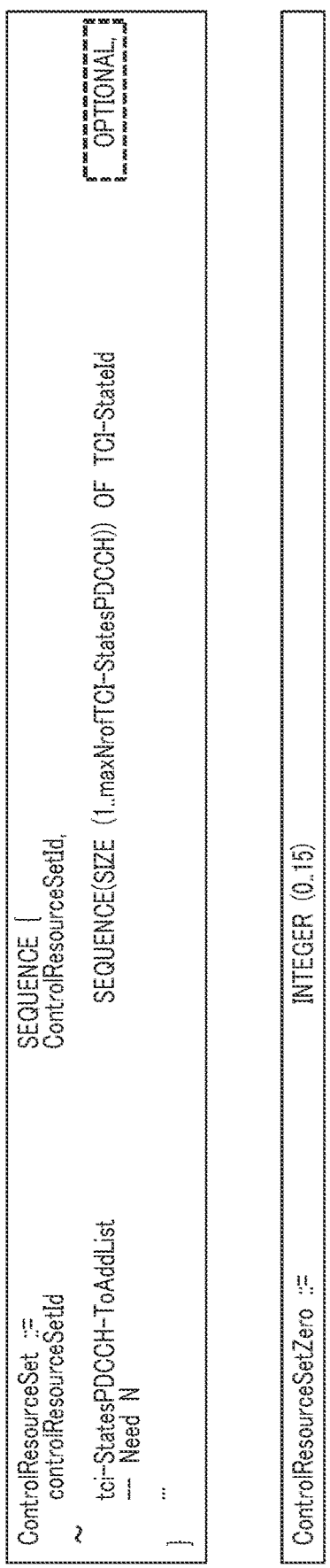
FIG. 6 illustrates an example of configuration information on CORESET (ControlResourceSet) according to the embodiment.

As depicted in FIG. 6, in setting of a parameter ControlResourceSet (CORESET), a TCI-state is set in OPTIONAL, and there is a case where the TCI state is not set.

Although a parameter ControlResourceSetZero is set as CORESET#0 of an initial DL BWP, it is not designed to be able to set the TCI state. The association between CORESET#0/SearchSpace#0 and an SSB (Synchronization Signal Block) index is defined.

Thus, there is a case where RLM-RS and/or BFD-RS is not set to explicit and the TCI state is not set in the CORESET of UE 20. However, that case is not assumed in the above stipulation of RLM and stipulation of BFD. That is, in the case, the UE is not available to perform appropriate RLM and/or BFD.

Therefore, the present embodiment describes a method by which UE 20 is possible to properly perform RLM and/or BFD even in the case where RLM-RS and/or BFD-RS is not set to explicit and the TCI state is not set in the CORESET of UE 20. That is, the embodiment clarifies the operation of UE 20 for RLM and/or BFD in the case where CORESET#0/SearchSpace#0 is set or a CORESET without TCI state is set, and describes a method that allows UE 20 to properly perform RLM and/or BFD.

The expression of "CORESET#O/SearchSpace#0" in the embodiment means that at least one of CORESET#0 and SearchSpace#0 is enough.

<Method 1>

In method 1, a case where CORESET#0/SearchSpace#0 is set, for example, in an MIB (Master Information Block) and/or RRC (Radio Resource Control) parameter will be described.

When CORESET#0/SearchSpace#0 is set, UE 20 targets an SS/PBCH block associated with CORESET#0/SearchSpace#0 currently being monitored for RLM and/or BFD.

Alternatively, when UE 20 performs random access when CORESET#0/SearchSpace#0 is set, UE 20 may target an SS/PBCH block (or CSI-RS) used for PRACH (Physical Random Access Channel) association in the latest (most recent) random access procedure for RLM and/or BFD.

Alternatively, when UE 20 performs random access when CORESET#0/SearchSpace#0 is set, UE 20 may handle an SS/PBCH block (or CSI-RS) used for PRACH (Physical Random Access Channel) association in the latest (most recent) random access procedure as RS in the active TCI state (related to the QCL-TypeD) and perform RLM and/or BFD.

Figure 7:
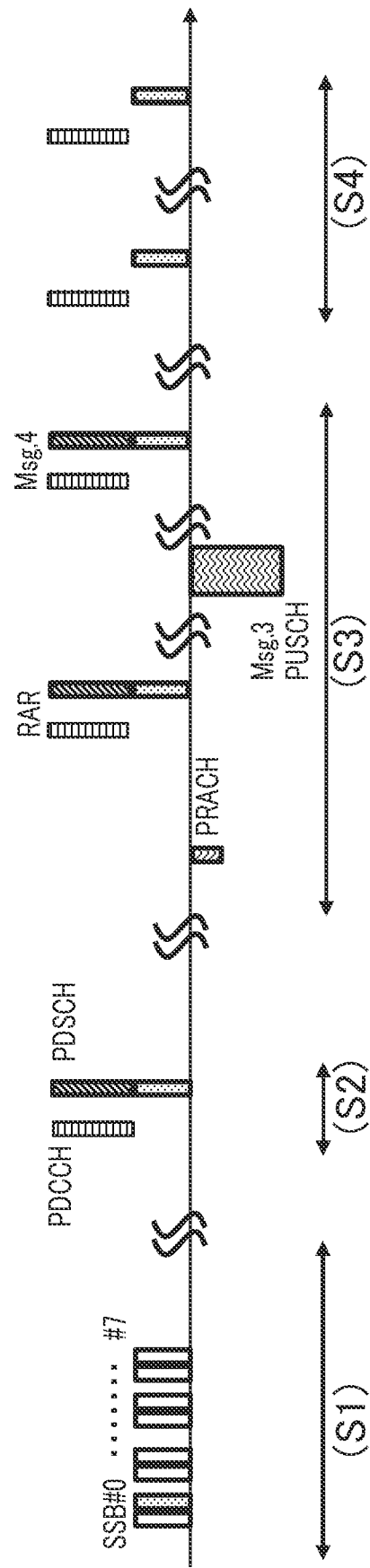
FIG. 7 illustrates an exemplary operation of the user terminal according to the embodiment.

Next, with reference to FIG. 7, an exemplary operation of UE 20 by method 1 will be described.

(S1) UE 20 performs initial cell search and detects, for example, SSB #1.

(S2) UE 20 receives SIB 1 on PDCCH and PDSCH of CORESET#0 associated with SSB #1.

(S3) UE 20 performs a random access procedure. Specifically, it performs the following procedure. UE 20 transmits PRACH at an RACH occasion associated with SSB #1. UE 20 receives a RAR (Random Access Response) through BF (Beam Forming) through which SSB #1 has been received. Thereafter, UE 20 performs Msg3 PUSCH transmission and Msg4 PDSCH reception related to the random access procedure in the same manner.

(S4) UE 20 operates in a CONNECTED mode and performs monitoring on CORESET#0/SearchSpace#0 associated with SSB #1. UE 20 then performs RLM and/or BFD for SSB #1. That is, UE 20 handles SSB #1 as RS in the active TCI state and performs RLM and/or BFD.

In application of method 1, an SSB index used for RLM and/or BFD may be a signal notified by a MAC CE (Control Element).

Although the TCI state is not available to be set in CORESET#0/SearchSpace#0, UE 20 is possible to perform equivalent operation as the case where an SSB associated as RS in the active TCI state (related to the QCL-TypeD) is set, according to method 1. That is, according to method 1, at least in the operation of RLM and/or BFD in UE 20, "RS provided for the active TCI state related to PDCCH reception" in CORESET#0/SearchSpace#0 becomes clear.

Method 1 may be expressed like at least one of the following (B1) to (B4).

(B1) When UE 20 monitors a PDCCH candidate in the ControlResourceSetZero/SearchSpaceZero, UE 20 uses an SS/PBCH block associated with the monitored ControlResourceSetZero/SearchSpaceZero for RMS and/or BFD.

(B2) When UE 20 monitors a PDCCH candidate in the ControlResourceSetZero/SearchSpaceZero on a serving cell, UE 20 may assume that an SS/PBCH block used last for the RACH procedure by UE 20 itself is RS provided for the active TCI state related to PDCCH reception.

(B3) When UE 20 is not provided with the higher layer parameter RadioLinkMonitoringRS and UE 20 is configured to monitor a PDCCH candidate in the parameter ControlResourceSetZero/SearchSpaceZero, UE 20 uses an SS/PBCH block used last for the RACH procedure by UE 20 itself for RMS.

(B4) When UE 20 is not provided with the higher layer parameter failureDetectionResources and when UE 20 is configured to monitor a PDCCH candidate in the parameter ControlResourceSetZero/SearchSpaceZero, the UE determines that the set of q-o (monitoring object RS) includes an SS/PBCH block used last for the RACH procedure by UE 20 itself.

<Method 2>

In method 2, a case where only a CORESET without TCI state (however, other than CORESET#0) is set, for example, in an RRC parameter will be described.

(a1) The following contents may be applied for an RLM operation in a PCell (Primary Cell). UE 20 assumes that RLM-RS is set to explicit in the parameter RadioLinkMonitoringConfig when only a CORESET without TCI state (however, other than CORESET#0) is set in the PCell. In other words, based on assumption that RLM is performed in the PCell, it is assumed that the PCell is configured such that RLM target RS is available to be recognized. That is, UE 20 handles a case where RLM-RS is not set as an error.

The (a1) described above may be expressed as follows. When UE 20 is not configured to monitor a PDCCH candidate in the ControlResourceSetZero/SearchSpaceZero and when UE 20 is not provided with one or more CSI-RS and/or one or more RS including an SS/PBCH block by the higher layer parameter TCI-states related to PDCCH reception, UE 20 does not expect that the higher layer parameter RadioLinkMonitoringRS is not provided. In other words, in this case, UE 20 expects that the parameter RadioLinkMonitoringRS is provided.

(a2) The following (Alt. 1) or (Alt. 2) may be applied for an RLM operation in a PSCell (Primary Secondary Cell).

(Alt. 1) UE 20 assumes that RLM-RS is set to explicit in the PSCell in the same manner as the above (a1). That is, UE 20 handles a case where RLM-RS is not set as an error.

(Alt. 2) In the PSCell, when only a CORESET without TCI state (however, other than CORESET#0) is set and when RLM-RS is not set to explicit in the parameter RadioLinkMonitoringConfig, UE 20 shall not perform the RLM operation in the PSCell.

The above (Alt. 2) may be expressed as follows. In a PSCell of an SCG (Secondary Cell Group), when UE 20 is not configured to monitor a PDCCH candidate in the parameter ControlResourceSetZero/SearchSpaceZero, when UE 20 is not provided with one or more CSI-RS and/or one or more RS including an SS/PBCH block by the higher layer parameter TCI-states related to PDCCH reception, and when UE 20 is not provided with the higher layer parameter RadioLinkMonitoringRS, UE 20 is not required to perform RLM in the PSCell of the SCG.

(b) The following (Alt. 1) or (Alt. 2) may be applied for a BFD operation in the PCell and/or PSCell.

(Alt. 1) UE 20 assumes that BFD-RS is set to explicit in the PCell (or PSCell) in the same manner as the above (a1). That is, UE 20 handles a case where BFD-RS is not set as an error.

(Alt. 2) When only a CORESET without TCI state (however, other than CORESET#0) is set and when BFD-RS is not set to explicit in the RadioLinkMonitoringConfig in the same manner as the above (a1) or (Alt. 2) of (a2), UE 20 shall not perform the BFD operation in the PCell (or PSCell).

Modified Example (Alt. 1) and (Alt. 2) in the RLM operation and (Alt. 1) and (Alt. 2) in the BFD operation may be combined in any way (or different combinations may be used).

In the BFD operation, (Alt. 1) and (Alt. 2) for the PCell and (Alt. 1) and (Alt. 2) for the PSCell may be combined in any way (or different combinations may be used).

Application targets of the embodiment are not limited to the above-described PCell and PSCell. For example, the embodiment may be applied to RLM and/or BFD in an SCell (Secondary Cell). In this case, UE 20 may use a different method from the above-described (Alt. 1) or (Alt. 2) for the PCell and PSCell.

Summary of Disclosure

User terminal 20 according to one aspect includes a reception section configured to receive control information on a downlink and a control section configured to perform processing related to at least one of radio link failure monitoring (RLM) and beam failure detection (BFD) based on a specified signal when the control information does not indicate information on a reference signal (RS) to be used for the processing nor downlink transmission configuration information (for example, TCI-states) associated with the reference signal (RS). The specified signal may be an SS/PBCH detected in cell search. Alternatively, the specified signal may be a signal notified by the MAC CE.

User terminal 20 according to one aspect includes a reception section configured to receive control information on a downlink and a control section configured to (1) determine that it is an error state or (2) determine not to perform processing related to at least one of radio link failure monitoring (RLM) and beam failure detection (BFD) when the control information does not indicate information on a reference signal (RS) to be used for the processing nor downlink transmission configuration information (for example, TCI-states) associated with the reference signal (RS).

With the above configuration, user terminal 20 is possible to achieve processing related to at least one of RLM and BFD.

The embodiment of the present disclosure has been described above.

(Hardware Configuration and the Like)

The block diagrams used in the description of the above embodiment illustrate blocks of functional units. These functional blocks (constituent sections) are implemented by any combination of at least one of hardware and software. Methods for implementing the functional blocks are not particularly limited. That is, the functional blocks may be implemented by using one apparatus physically or logically coupled. Two or more apparatuses physically or logically separated may be directly or indirectly (for example, using wires or radio) connected, and the plurality of apparatuses may implement the functional blocks. The functional blocks may be implemented by combining software with the above-described one apparatus or the above-described plurality of apparatuses.

Functions include, but not limited to, judging, deciding, determining, computing, calculating, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating or mapping, and assigning. For example, a functional block (constituent section) that makes transmission function is called a transmitting section or a transmitter. In any case, as described above, implementation methods are not particularly limited.

Figure 8:
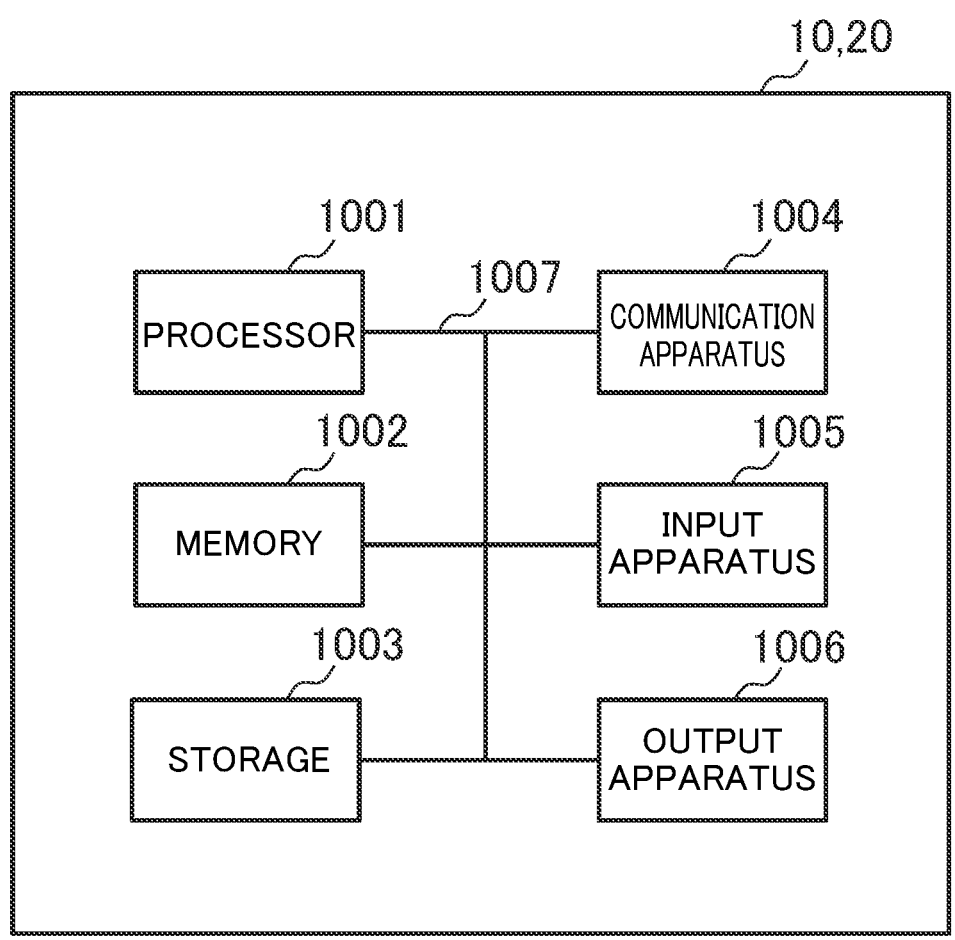
FIG. 8 illustrates an exemplary hardware configuration of the user terminal and the radio base station according to the embodiment.

For example, the base station, the user terminal, and the like in the embodiment of the present disclosure may function as a computer that executes processing of the radio communication methods of the disclosure. FIG. 8 illustrates an exemplary hardware configuration of the base station and the user terminal according to the embodiment of the present disclosure. Base station 10 and user terminal 20 described above may be physically configured as a computer apparatus including processor 1001, memory 1002, storage 1003, communication apparatus 1004, input apparatus 1005, output apparatus 1006, bus 1007, and the like.

The term "apparatus" in the following description may be read as a circuit, a device, a unit, or the like. The hardware configurations of base station 10 and user terminal 20 may include one or more apparatuses for each of the apparatuses illustrated in the figure or may not include some of the apparatuses.

The functions in base station 10 and user terminal 20 are implemented by loading predetermined software (program) into hardware, such as processor 1001 and memory 1002, thereby causing processor 1001 to perform arithmetic and control communication performed by communication apparatus 1004 and at least one of reading and writing data from or into memory 1002 and storage 1003.

Processor 1001 operates an operating system to entirely control the computer, for example. Processor 1001 may be composed of a central processing unit (CPU) including an interface with peripheral apparatuses, a control apparatus, an arithmetic apparatus, a register, and the like. For example, scheduler 101, control section 201, higher layer processing sections 102 and 202, error control sections 103 and 203, coding and decoding sections 104 and 204, modulation and demodulation sections 105 and 205, resource mapping and demapping sections 106 and 206, antenna mapping and demapping sections 107 and 207, and the like described above may be implemented by processor 1001.

Processor 1001 reads out a program (program code), a software module, or data from at least one of storage 1003 and communication apparatus 1004 to memory 1002 and executes various types of processing according to the read-out program or the like. The program used is a program for causing the computer to execute at least part of the operations described in the embodiment. For example, control section 201 of user terminal 20 may be implemented by a control program stored in memory 1002 and executed by processor 1001, and the other functional blocks may also be implemented in the same way. While it has been explained that the various types of processing described above are executed by one processor 1001, the various types of processing may be executed by two or more processors 1001 at the same time or in succession. Processor 1001 may be implemented by one or more chips. The program may be transmitted from a network through a telecommunication line.

Memory 1002 is a computer-readable recording medium and may be composed of at least one of, for example, a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 is available in saving a program (program code), a software module, and the like that may be executed to carry out the radio communication methods according to the embodiment of the present disclosure.

Storage 1003 is a computer-readable recording medium and may be composed of at least one of, for example, an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium described above may be, for example, a database, a server, or another appropriate medium including at least one of memory 1002 and storage 1003.

Communication apparatus 1004 is hardware (transmission/reception device) for communication between computers through at least one of a wired network and a radio network and is also called, for example, a network device, a network controller, a network card, or a communication module. Communication apparatus 1004 may be composed of a high-frequency switch, a duplexer, a filter, a frequency synthesizer, and the like in order to implement at least one of, for example, frequency division duplex (FDD) and time division duplex (TDD). For example, antennas 108 and 208 and the like described above may be implemented by communication apparatus 1004. A transmission/reception section may be implemented in such a way that a transmission section and a reception section are physically or logically separated from each other.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) that outputs to the outside. Input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or buses different among the apparatuses.

Furthermore, base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by using at least one of these pieces of hardware.

<Notification and Signaling of Information>

The notification of information is not limited to the aspects/embodiment described in the present disclosure, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block) and SIB (System Information Block))), and other signals. The RRC signaling may be called an RRC message and may be, for example, an RRC connection setup message or an RRC connection reconfiguration message.

<Applicable System>

The aspects/embodiment described in the present disclosure may be applied to at least one of systems using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and next-generation systems extended based on those systems. In addition, they may be applied to combinations of a plurality of systems (for example, a combination of 5G and at least one of LTE and LTE-A).

<Processing Procedure and the Like>

The orders of the processing procedures, the sequences, the flow charts, and the like of the aspects/embodiment described in the present disclosure may be changed as long as there is no contradiction. For example, elements of various steps are presented in exemplary orders in the methods described in the present disclosure, and the methods are not limited to the presented specific orders.

<Operations of Base Station>

The specific operations which are described in the disclosure as being performed by the base station may be performed by an upper node depending on the situation. Various operations performed for communication with a terminal in a network including one or more network nodes including a base station may be obviously performed by the base station and/or a network node other than the base station (examples include, but not limited to, MME or S-GW). Although the case where there is one network node other than the base station is illustrated in the above, a plurality of other network nodes may be combined (for example, MME and S-GW).

<Directions of Input and Output>

The information and the like (see paragraph "Information and Signals") may be output from a higher layer (or a lower layer) to a lower layer (or a higher layer). The information and the like may be input and output through a plurality of network nodes.

<Handling of Input and Output Information and the Like>

The input and output information and the like may be saved in a specific place (for example, a memory) or may be managed using a management table. The input and output information and the like may be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

<Variation or the Like of Aspects>

The aspects/embodiment described in the disclosure may be used singly, may be used in combination, or may be used by switching them according to execution. Notification of predetermined information (for example, notification of "being X") is not limited to being performed explicitly, and may be performed implicitly (for example, by not notifying the predetermined information).

While the present disclosure has been described in detail, it is obvious to those skilled in the art that the present disclosure is not limited to the embodiment described in the present disclosure. The present disclosure may be implemented as modifications and variations of the aspects without departing from the spirit and the scope of the present disclosure defined by the description of the appended claims. Therefore, the description of the present disclosure is intended for exemplary description and does not limit the present disclosure in any sense.

<Software>

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (such as a coaxial cable, an optical fiber cable, a twisted pair, and a digital subscriber line (DSL)) and a radio technique (such as an infrared ray and a microwave), at least one of the wired technique and the radio technique is included in the definition of the transmission medium.

<Information and Signals>

The information, the signals, and the like described in the present disclosure may be expressed by using any of various different techniques. For example, data, instructions, commands, information, signals, bits, symbols, chips, and the like that may be mentioned throughout the entire description above may be expressed by voltage, current, electromagnetic waves, magnetic fields or magnetic particles, optical fields or photons, or any combination thereof.

The terms described in the present disclosure and the terms necessary to understand the present disclosure may be replaced with terms with the same or similar meaning. For example, at least one of the channel and the symbol may be signaling. The signaling may be a message. The component carrier (CC) may be called a carrier frequency, a cell, a frequency carrier, or the like.

<"System" and "Network">

The terms "system" and "network" used in the present disclosure may be interchangeably used.

<Names of Parameters and Channels>

The information, the parameters, and the like described in the present disclosure may be expressed by absolute values, by values relative to predetermined values, or by other corresponding information. For example, radio resources may be indicated by indices.

The above-described names used for the parameters are not limiting names in any respect. Furthermore, numerical formulas and the like using the parameters may be different from the ones explicitly disclosed in the present disclosure. Various channels (for example, PUCCH and PDCCH) and information elements may be identified by any suitable names, and various names assigned to these various channels and information elements are not limiting names in any respect.

<Base Station>

Terms "base station (BS)," "radio base station," "fixed station," "Node B," "eNode B (eNB)," "gNode B (gNB)," "access point," "transmission point," "reception point," "transmission/reception point," "cell," "sector," "cell group," "carrier," "component carrier," and the like may be used interchangeably in the disclosure. The base station may also be called by terms such as a macro cell, a small cell, a femtocell, and a picocell.

The base station may accommodate one or more (for example, three) cells. When the base station accommodates a plurality of cells, the entire coverage area of the base station may be divided into a plurality of smaller areas, and in each of the smaller areas, a communication service may be provided by a base station subsystem (for example, a small base station for indoor, remote radio head (RRH)). The term "cell" or "sector" denotes part or all of the coverage area of at least one of the base station and the base station subsystem that provide the communication service in the coverage.

<Mobile Station>

The terms "mobile station (MS)," "user terminal," "user equipment (UE)," "terminal," and the like may be interchangeably used in the present disclosure.

The mobile station may be sometimes called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, client, or some other appropriate terms.

<Base Station/Mobile Station>

At least one of the base station and the mobile station may be called a transmission apparatus, a reception apparatus, a communication apparatus, and the like. At least one of the base station and the mobile station may be a device mounted on a movable body, a movable body itself, or the like. The movable body may be a vehicle (for example, a car or an airplane), may be an unmanned movable body (for example, a drone or a self-driving vehicle), or may be a robot (manned or unmanned). At least one of the base station and the mobile station also includes an apparatus that does not necessarily move during communication operation. For example, at least one of the base station and the mobile station may be an IOT (Internet of Things) device such as a sensor.

The base station in the disclosure may be read as a user terminal. For example, the aspects/embodiment of the disclosure may be applied to a configuration in which communication between the base station and the user terminal is replaced with communication between a plurality of user terminals (for example, may be called D2D (Device-to-Device) and V2X (Vehicle-to-Everything)). In this case, user terminal 20 may have the above-described functions of base station 10. In addition, the terms "uplink," "downlink," and the like may be read as a term (for example, "side") corresponding to inter-terminal communication. For example, the uplink channel, the downlink channel, and the like may be read as a side channel.

In the same manner, the user terminal in the disclosure may be read as a base station. In this case, base station 10 may have the above-described functions of user terminal 20.

<Meaning and Interpretation of Terms>

The term "determining" used in the disclosure may encompass a wide variety of actions. For example, "determining" may include regarding, as "determining," judging, calculating, computing, processing, deriving, investigating, looking up (or searching or inquiring) (e.g., looking up in a table, a database, or another data structure), and ascertaining. Also, "determining" may include regarding, as "determining," receiving (e.g., receiving information), transmitting (e.g., transmitting information), inputting, outputting, and accessing (e.g., accessing data in a memory). Also, "determining" may include regarding, as "determining," resolving, selecting, choosing, establishing, comparing, or the like. That is, "determining" may include regarding some action as "determining." In addition, "determining" may be read as assuming, expecting, considering, or the like.

The terms "connected" and "coupled" as well as any modifications of the terms mean any direct or indirect connection or coupling between two or more elements, and may encompass the presence of one or more intermediate elements between two elements "connected" or "coupled" with each other. The coupling or the connection between elements may be physical or logical or may be a combination thereof. For example, "connection" may be read as "access." When the terms are used in the present disclosure, two elements may be considered to be "connected" or "coupled" with each other by using at least one of one or more electrical wires, cables, and printed electrical connections, or by using electromagnetic energy with a wavelength of a radio frequency domain, a microwave domain, or an optical (both visible and invisible) domain as non-limiting and non-inclusive examples.

<Reference Signal>

The reference signal may be abbreviated as RS and may be called a pilot depending on an applied standard.

<Meaning of "Based On">

The description "based on" used in the disclosure does not mean "based only on," unless otherwise specifically stated. In other words, the description "based on" means both of "based only on" and "based at least on."

<"First" and "Second">

Any reference to elements using designations such as "first" and "second" used in the disclosure does not generally limit amounts or order of the elements. These designations may be used herein as a convenient way to distinguish between two or more elements. Thus, reference to first and second elements does not imply that only two elements may be employed or that the first element must precede the second element in some way.

<Means>

"Means" in the configuration of each of the above-described apparatuses may be replaced with "section," "circuit," "device," and the like.

<Open Form>

As long as "include," "including," and modifications thereof are used in the disclosure, the terms are intended to be inclusive just like the term "comprising." Furthermore, the term "or" used in the disclosure is not intended to be an exclusive or.

<Time Unit of TTI and the like, Frequency Unit of RB and the like, and Radio Frame Configuration>

The radio frame may be constituted by one or more frames in the time domain. Each of the one or more frames may be called a subframe in the time domain.

The subframe may be further constituted by one or more slots in the time domain. The subframe may be a fixed time length (for example, 1 ms) independent of numerology.

The numerology may be a communication parameter applied to a certain signal or at least one of transmission and reception of a channel. The numerology may indicate at least one of, for example, subcarrier spacing (SCS), bandwidth, symbol length, cyclic prefix length, a transmission time interval (TTI), the number of symbols per TTI, a radio frame configuration, specific filtering processing which a transceiver performs in the frequency domain, and specific windowing processing which the transceiver performs in the time domain.

The slot may be composed of one or more symbols (OFDM (Orthogonal Frequency Division Multiplexing) symbols, SC-FDMA (Single Carrier Frequency Division Multiple Access) symbols, or the like) in the time domain. The slot may be a time unit based on numerology.

The slot may include a plurality of minislots. Each minislot may be composed of one or more symbols in the time domain. The minislot may be called a subslot. The minislot may be composed of a fewer number of symbols than the slot. PDSCH (or PUSCH) transmitted in a time unit larger than the minislot may be called a PDSCH (or PUSCH) mapping type A. PDSCH (or PUSCH) transmitted using the minislot may be called a PDSCH (or PUSCH) mapping type B.

All of the radio frame, the subframe, the slot, the minislot, and the symbol represent time units when signals are transmitted. For the radio frame, the subframe, the slot, the minislot, and the symbol, different designations corresponding to each may be used.

For example, one subframe may be called a transmission time interval (TTI), or a plurality of consecutive subframes may be called a TTI, or one slot or one minislot may be called a TTI. That is, at least one of the subframe and the TTI may be the existing subframe (1 ms) in LTE, may be a period shorter than 1 ms (for example, 1-13 symbols), or may be a period longer than 1 ms. The unit representing the TTI may be called a slot, a minislot, or the like rather than the subframe.

Here, the TTI refers to, for example, the minimum time unit of scheduling in radio communication. For example, in the LTE system, the base station performs scheduling of allocating radio resources (frequency bandwidth, transmission power, or the like which each user terminal may use) to each user terminal in TTI units. The definition of the TTI is not limited to this.

The TTI may be a transmission time unit for a channel-coded data packet (transport block), a code block, a code word, or the like, or may be a processing unit for scheduling, link adaptation, or the like. When a TTI is given, a time interval (for example, the number of symbols) in which a transport block, a code block, a code word, or the like is actually mapped may be shorter than the TTI.

When one slot or one minislot is called a TTI, one or more TTIs (that is, one or more slots or one or more minislots) may be the minimum time unit for scheduling. In addition, the number of slots (number of minislots) constituting the minimum time unit of the scheduling may be controlled.

A TTI having a time length of 1 ms may be called a usual TTI (TTI in LTE Rel. 8-12), a normal TTI, a long TTI, a usual subframe, a normal subframe, a long subframe, a slot, or the like. A TTI shorter than the usual TTI may be called a shortened TTI, a short TTI, a partial or fractional TTI, a shortened subframe, a short subframe, a minislot, a subslot, a slot or the like.

The long TTI (for example, the usual TTI and the subframe) may be read as a TTI having a time length exceeding 1 ms, and the short TTI (for example, the shortened TTI) may be read as a TTI having a TTI length less than the TTI length of the long TTI and equal to or more than 1 ms.

A resource block (RB) is a resource assignment unit in the time domain and the frequency domain, and may include one subcarrier or a plurality of continuous subcarriers in the frequency domain. The number of subcarriers included in the RB may be the same regardless of numerology, and may be, for example, 12. The number of subcarriers included in the RB may be determined based on numerology.

In addition, the RB may include one or more symbols in the time domain, and may have the length of one slot, one minislot, one subframe, or one TTI. One TTI, one subframe, and the like may be constituted by one or more resource blocks.

One or more RBs may be called a physical resource block (PRB: Physical RB), a subcarrier group (SCG), a resource element group (REG), a PRB pair, an RB pair, or the like.

The resource block may be constituted by one or more resource elements (REs). For example, one RE may be a radio resource region of one subcarrier and one symbol.

A bandwidth part (BWP) (may be called partial bandwidth or the like) may represent a subset of consecutive common RBs (common resource blocks) for certain numerology in a certain carrier. Here, the common RBs may be specified by an index of the RB based on a common reference point of the carrier concerned. A PRB may be defined by certain BWP, and numbered in the BWP.

The BWP may include BWP for UL (UL BWP) and BWP for DL (DL BWP). One or more BWPs are set in one carrier for the UE.

At least one of set BWPs may be active, and the UE may not assume that the UE transmits or receives a predetermined signal/channel outside the active BWP. "Cell," "carrier," and the like in the disclosure may be read as "BWP."

The above-described structures of the radio frame, the subframe, the slot, the minislot, the symbol, and the like are merely examples. It is possible to variously change the configurations, for example, the number of subframes included in the radio frame, the number of slots per subframe or radio frame, the number of minislots included in the slot, the numbers of symbols and RBs included in the slot or the minislot, the number of subcarriers included in the RB, and the number of symbols in the TTI, symbol length, and cyclic prefix (CP) length.

<Maximum Transmission Power>

The "maximum transmission power" described in the disclosure may mean the maximum value of transmission power, may mean the nominal UE maximum transmit power, or may mean the rated UE maximum transmit power.

<Article>

When articles, for example, like "a," "an," and "the" in English, are added by translation in the disclosure, the disclosure may include plural forms of nouns following these articles.

<"Different">

The clause "A and B are different" in the disclosure may mean "A and B are mutually different." The clause may mean "A and B are each different from C." The terms "leaving," "coupled," and the like may be interpreted in the same manner as "different."

INDUSTRIAL APPLICABILITY

An aspect of the present disclosure is useful for a radio communication system.

REFERENCE SIGNS LIST

10 Radio Base Station
20 User Terminal
101 Scheduler
201 Control Section
102, 202 Higher Layer Processing Section
103, 203 Error Control Section
104, 204 Coding and Decoding Section
105, 205 Modulation and Demodulation Section
106, 206 Resource Mapping and Demapping Section
107, 207 Antenna Mapping and Demapping Section
108, 208 Antenna

The invention claimed is:

1. A terminal, comprising:
a control section that determines to use a synchronization signal/physical broadcast channel block, SSB, in a most recent random access procedure for receiving a physical downlink control channel in a case where a transmission configuration indication, TCI, state is not indicated for a control resource set with a specific index; and
a reception section that receives the physical downlink control channel.

2. The terminal according to claim 1, wherein the specific index is zero.

3. A method, comprising:
determining to use a synchronization signal/physical broadcast channel block, SSB, in a most recent random access procedure for receiving a physical downlink control channel in a case where a transmission configuration indication, TCI, state is not indicated for a control resource set with a specific index; and
receiving the physical downlink control channel.

4. A system, comprising:
a base station; and
a terminal, wherein
the terminal includes
a control section that determines to use a synchronization signal/physical broadcast channel block, SSB, in a most recent random access procedure for receiving a physical downlink control channel in a case where a transmission configuration indication, TCI, state is not indicated for a control resource set with a specific index, and
a reception section that receives the physical downlink control channel from the base station.

5. A terminal, comprising:
a reception section that receives a higher layer parameter; and
a control section that determines information related to a reference signal for at least one of radio link monitoring, RLM, and beam failure detection, BFD, is indicated in the higher layer parameter in a case where a transmission configuration indication, TCI, state is not indicated in a control resource set with an index other than a specific index.

6. The terminal according to claim 5, wherein the specific index is zero.

* * * * *